United States Patent
Ohsugi (10) Patent No.: US 12,555,422 B2
(45) Date of Patent: Feb. 17, 2026

(54) AUTONOMOUS DRIVING SYSTEM

(71) Applicant: TOYOTA JIDOSHA KABUSHIKI KAISHA, Toyota (JP)

(72) Inventor: Masamichi Ohsugi, Sunto-gun Shizuoka (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 18/813,883

(22) Filed: Aug. 23, 2024

(65) Prior Publication Data
US 2025/0078588 A1 Mar. 6, 2025

(30) Foreign Application Priority Data
Sep. 4, 2023 (JP) .................................. 2023-143163

(51) Int. Cl.
*G07C 5/08* (2006.01)
*B60W 60/00* (2020.01)

(52) U.S. Cl.
CPC .................................. *G07C 5/085* (2013.01)

(58) Field of Classification Search
CPC ..... G07C 5/085; B60W 60/001; B60W 30/12; B60W 30/16; B60W 30/162; B60W 30/165; B60W 30/17; B60K 28/00–16; G05D 1/0088; G05D 1/021; G05D 1/0214; G05D 1/0221; G05D 1/0223
USPC ....................................................... 701/33.4
See application file for complete search history.

(56) References Cited

U.S. PATENT DOCUMENTS

| | | | |
|---|---|---|---|
| 9,120,484 B1* | 9/2015 | Ferguson | G06T 7/20 |
| 10,830,605 B1* | 11/2020 | Chintakindi | G01C 21/3461 |
| 11,378,955 B2* | 7/2022 | Censi | G05D 1/0257 |
| 11,541,909 B1* | 1/2023 | Poubel Orenstein | B60W 60/0013 |
| 11,952,001 B1* | 4/2024 | Wang | G05B 17/02 |
| 12,325,449 B1* | 6/2025 | Agarwal | B60W 30/0956 |
| 2017/0123428 A1* | 5/2017 | Levinson | B60W 60/0011 |
| 2017/0124476 A1* | 5/2017 | Levinson | G06V 20/58 |
| 2019/0220010 A1* | 7/2019 | Leonard | B60W 50/14 |
| 2019/0220011 A1* | 7/2019 | Della Penna | G07C 5/0841 |
| 2019/0220014 A1* | 7/2019 | Bradley | G06V 20/58 |
| 2020/0017124 A1* | 1/2020 | Camhi | B60W 60/0053 |
| 2020/0193736 A1 | 6/2020 | Lawrence et al. | |

(Continued)

FOREIGN PATENT DOCUMENTS

| | | |
|---|---|---|
| JP | 2019-125867 A | 7/2019 |
| JP | 2021-174413 A | 11/2021 |

(Continued)

*Primary Examiner* — Manglesh M Patel
(74) *Attorney, Agent, or Firm* — Dinsmore & Shohl LLP (57) ABSTRACT

An autonomous driving system for causing a storage unit of a vehicle to store output data related to autonomous driving control calculated based on a detection result of an in-vehicle sensor of the vehicle, the autonomous driving system including: a log acquisition unit configured to acquire a driving scene in which the output data is calculated and the output data as log data in association with each other; an influence degree acquisition unit configured to acquire a preset degree of influence of the driving scene on surroundings of the vehicle based on the driving scene; and a log storage unit configured to cause the storage unit of the vehicle to store the log data with a priority corresponding to the degree of influence of the driving scene associated with the log data.

2 Claims, 3 Drawing Sheets

(56) References Cited

U.S. PATENT DOCUMENTS

| | | |
|---|---|---|
| 2020/0302233 A1 | 9/2020 | Iwasaki |
| 2020/0356828 A1* | 11/2020 | Palanisamy ............. G06F 18/25 |
| 2021/0024095 A1* | 1/2021 | Tao ..................... G05B 19/042 |
| 2021/0064044 A1* | 3/2021 | Refaat ................. G05D 1/0219 |
| 2021/0284195 A1* | 9/2021 | Zhu ........................ G06V 20/58 |
| 2021/0347383 A1* | 11/2021 | Siebert ............... G01C 21/3407 |
| 2021/0354730 A1* | 11/2021 | Anthony ......... B60W 60/00272 |
| 2022/0073085 A1* | 3/2022 | Wang ................... G06F 18/254 |
| 2022/0126864 A1* | 4/2022 | Moustafa .......... B60W 60/0013 |
| 2022/0126869 A1* | 4/2022 | Wang ................ B60W 60/0027 |
| 2022/0204009 A1* | 6/2022 | Choi .................... G06F 11/3696 |
| 2022/0254198 A1 | 8/2022 | Hirano et al. |
| 2023/0063930 A1 | 3/2023 | Ichida et al. |
| 2023/0071259 A1* | 3/2023 | Liu ..................... G06F 11/3698 |
| 2024/0092357 A1* | 3/2024 | Kobilarov ......... B60W 30/0956 |
| 2024/0202577 A1* | 6/2024 | Bagschik ............... G07C 5/085 |
| 2024/0351606 A1* | 10/2024 | Hormasji ............... G07C 5/085 |
| 2025/0376193 A1* | 12/2025 | Matsumoto ......... B60W 60/005 |

FOREIGN PATENT DOCUMENTS

| | | |
|---|---|---|
| WO | 2019/116423 A1 | 6/2019 |
| WO | 2021/145145 A1 | 7/2021 |

\* cited by examiner

AUTONOMOUS DRIVING SYSTEM

TECHNICAL FIELD

Th present disclosure relates to an autonomous driving system.

CROSS-REFERENCE TO RELATED APPLICATION

This application claims the benefit of priority from Japanese Patent Application No. 2023-143163, filed on Sep. 4, 2023, the entire contents of which are incorporated herein by reference.

BACKGROUND

Technology for assigning a label in accordance with whether or not a vehicle has taken an avoidance operation with respect to external environmental information collected by a camera mounted on a vehicle is known (for example, PCT International Publication No. WO2019/116423).

In an autonomous driving system, the calculation of autonomous driving control is performed based on a detection result of an in-vehicle sensor. For post-verification of a result of calculating the autonomous driving control, it is conceivable to collect and store output data related to the autonomous driving control during the driving of the vehicle as log data. However, when an amount of output data is large, log data cannot be stored in a storage unit of the vehicle and there is a possibility that the collection of the log data will be hindered.

An objective of the present disclosure is to provide an autonomous driving system capable of ensuring the storage of log data for use in post-verification of a result of calculating autonomous driving control.

SUMMARY

According to an aspect of the present disclosure, there is provided an autonomous driving system for causing a storage unit of a vehicle to store output data related to autonomous driving control calculated based on a detection result of an in-vehicle sensor of the vehicle, the autonomous driving system including: a log acquisition unit configured to acquire a driving scene in which the output data is calculated and the output data as log data in association with each other; an influence degree acquisition unit configured to acquire a preset degree of influence of the driving scene on surroundings of the vehicle based on the driving scene; and a log storage unit configured to cause the storage unit of the vehicle to store the log data with a priority corresponding to the degree of influence of the driving scene associated with the log data.

In the autonomous driving system according to the aspect of the present disclosure, the log data in which the output data and the driving scene are associated with each other is stored in the storage unit of the vehicle with a priority corresponding to the degree of influence of the driving scene. For example, it is possible to effectively collect useful log data by preferentially storing log data corresponding to a driving scene having a large influence on the surroundings of the vehicle in the storage unit of the vehicle. Therefore, the autonomous driving system according to the aspect of the present disclosure can ensure the storage of log data for use in post-verification of a result of calculating the autonomous driving control.

In an embodiment, the autonomous driving system includes a capacity shortage prediction unit configured to predict a future capacity shortage in the storage unit of the vehicle based on a period of time of the autonomous driving control and a road situation until the vehicle reaches a destination, wherein the log storage unit is configured to cause the storage unit of the vehicle to store the log data with a priority corresponding to the degree of influence when the capacity shortage in the storage unit of the vehicle is predicted.

In an embodiment, the autonomous driving system includes an external storage unit configured to store the log data transmitted from the vehicle via a network; and a communication unit provided in the vehicle and configured to communicate with the external storage unit, wherein the log storage unit is configured to transmit the log data to the external storage unit and delete the transmitted log data from the storage unit of the vehicle.

According to the present disclosure, it is possible to ensure the storage of log data for use in post-verification of a result of calculating autonomous driving control.

DETAILED DESCRIPTION

Hereinafter, exemplary embodiments will be described with reference to the drawings. In the following description, the same reference signs may be attached to the same or equivalent elements, and redundant description thereof may be omitted.

Figure 1:
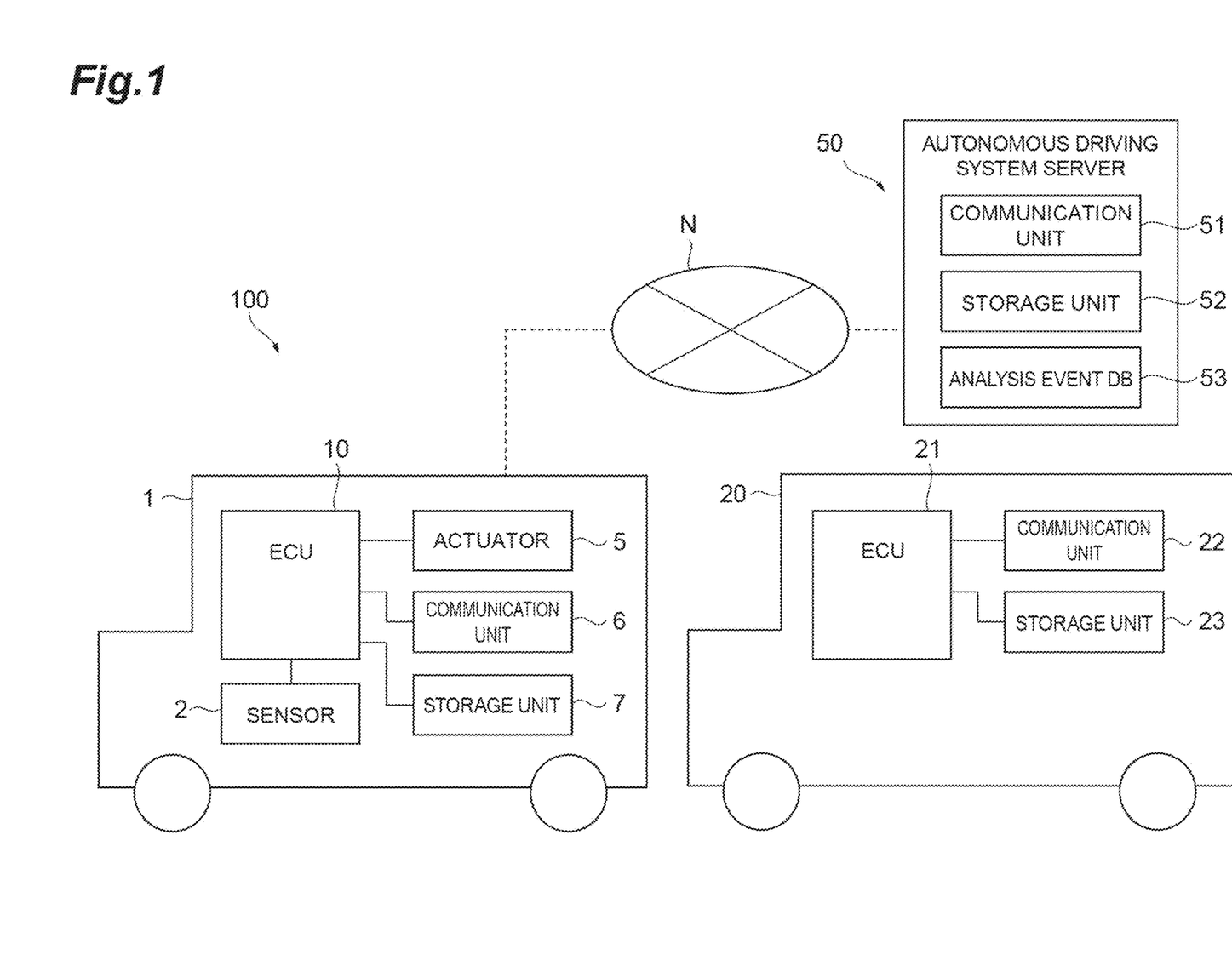
FIG. 1 is a schematic block diagram showing a configuration of an autonomous driving system according to an embodiment.
Figure 2:
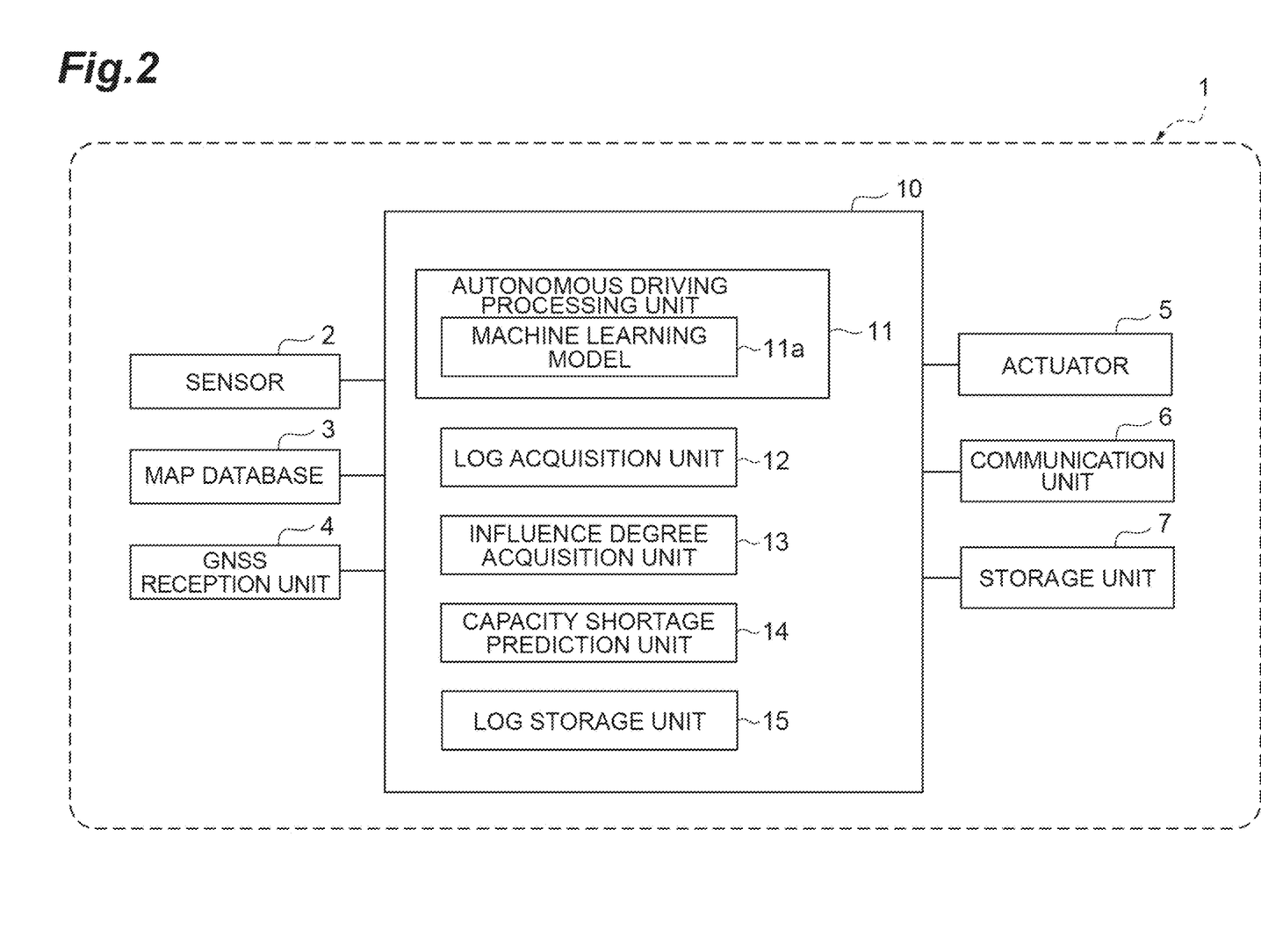
FIG. 2 is a schematic block diagram showing an example of a configuration of a vehicle of the autonomous driving system of FIG. 1.

As shown in FIGS. 1 and 2, an autonomous driving system 100 according to an embodiment is a system for performing autonomous driving of a vehicle 1. The vehicle 1 is not particularly limited and may be a passenger car or a freight car. The vehicle 1 is an autonomous driving vehicle capable of autonomous driving. A driver may manually drive the vehicle 1.

The autonomous driving system 100 stores output data related to autonomous driving control calculated based on a detection result of an in-vehicle sensor of the vehicle 1 in a storage unit of the vehicle 1. The autonomous driving system 100 includes a sensor 2, a map database 3, a GNSS reception unit 4, an actuator 5, a communication unit 6, a storage unit 7, and an electronic control unit (ECU) 10.

The sensor 2 is an in-vehicle sensor that detects information about at least one of a traveling state and a surrounding situation of the vehicle 1. The sensor 2 has an external sensor and an internal sensor. The external sensor is a sensor that acquires the surrounding environment of the vehicle 1. The external sensor includes, for example, at least one of a camera, a millimeter-wave radar, a light detection and ranging (LiDAR) sensor, and the like. The internal sensor is a detection device that detects the traveling state of the vehicle 1. The internal sensor includes at least one of a vehicle speed sensor, an acceleration sensor, and a yaw rate sensor. The sensor 2 transmits a detection result to the ECU 10.

The map database 3 is a storage device that stores map information. The map database 3 is formed within a storage medium such as, for example, a hard disk drive (HDD) mounted in the vehicle 1. The map information includes information of positions, shapes, and the like of roads, intersections, branch points, and the like (for example, positions and shapes of intersections, lane widths, positions of markings and pedestrian crossings, and the like). In addition, the map information may include information of structures (such as positions and types of traffic lights provided at intersections) and various types of traffic rule information (one-way traffic, prohibition of right and left turns, information of prohibition of turning, and the like). Also, a part of the map information included in the map database 3 may be stored in a storage device different from the HDD or the like. The map database 3 may be formed on a computer of a facility such as a management center that can communicate with the vehicle 1.

The GNSS reception unit 4 measures a current vehicle position of the vehicle 1 (for example, the latitude and longitude of the vehicle 1) by receiving a signal from a positioning satellite. The GNSS reception unit 4 transmits measured position information of the vehicle 1 to the ECU 10.

The actuator 5 is a controller for controlling the traveling of the vehicle 1. The actuator 5 may include, for example, an actuator that controls the output of an engine or motor, and a brake actuator, to control the speed of the vehicle 1. The actuator 5 may include, for example, a steering actuator that controls a steering angle or steering torque, to control the steering of the vehicle 1.

The communication unit 6 is a communication device that controls wireless communication with the outside of the vehicle 1. The communication unit 6, for example, performs communication of various types of information with an autonomous driving system server (external storage unit) 50 via a communication network N. The communication unit 6, for example, performs communication of various types of information with other vehicles (external storage units) 20 in the vicinity of the vehicle 1 via the communication network N. The communication unit 6 is not particularly limited and various known communication devices can be used.

The storage unit 7 stores log data for use in post-verification of a result of calculating the autonomous driving control. The storage unit 7 is mounted in the vehicle 1. The storage unit 7 is, for example, a recording device such as an HDD mounted in the vehicle 1. The storage unit 7 has a log storage area for storing log data. The log storage area has a finite capacity. The log data will be described in detail below.

The ECU 10 is an electronic control unit having a central processing unit (CPU), a read-only memory (ROM), a random-access memory (RAM), and the like. For example, the ECU 10 implements various types of functions by loading a program recorded in the ROM into the RAM and executing the program loaded into the RAM on the CPU. The ECU 10 may include a plurality of electronic control units. The ECU 10 includes an autonomous driving processing unit 11, a log acquisition unit 12, an influence degree acquisition unit 13, a capacity shortage prediction unit 14, and a log storage unit 15 as a functional configuration.

The autonomous driving processing unit 11 executes autonomous driving control based on a detection result of the sensor 2. The autonomous driving processing unit 11 calculates output data related to the autonomous driving control based on the detection result of the sensor 2, the map information, and the vehicle position. The output data is calculated by the ECU 10 and output to the actuator 5 and is data for performing autonomous driving. The output data includes, for example, data for controlling at least one of driving, braking, and steering of the vehicle 1.

As an example, the autonomous driving processing unit 11 calculates output data related to the autonomous driving control using a machine learning model 11a. For example, the autonomous driving processing unit 11 inputs the detection result of the sensor 2 to the machine learning model 11a and outputs a control signal obtained thereby to the actuator 5. Thereby, the autonomous driving processing unit 11 controls the driving, braking, and steering of the vehicle 1 to perform autonomous driving.

The machine learning model 11a is a recursive deep learning model. The machine learning model 11a is a recurrent neural network (RNN). A convolutional neural network (CNN) including a plurality of layers including a plurality of convolutional layers and a pooling layer may be used in at least a part of the neural network. In the machine learning model 11a, deep machine learning based on deep learning is performed. The machine learning model 11a is a trained model that has been trained using data of the vehicle 1 having a predetermined learning condition. For example, the machine learning model 11a may be trained using training data for an output to the actuator 5, for example, when various types of detection results of the sensor 2 are input.

The log acquisition unit 12 identifies a driving scene when the autonomous driving processing unit 11 calculates output data based on the detection result of the sensor 2 of the vehicle 1, the map information, and the vehicle position. The driving scene indicates the driving situation of the vehicle 1. The driving scene includes, for example, a road shape (a straight road shape, a curve shape, or the like) of the road on which the vehicle 1 is traveling, a situation of other vehicles around the vehicle 1, and a traveling situation of the vehicle 1. Examples of driving scenes include lane changes, right and left turns at intersections, approaching emergency vehicles, passing through construction sites, traveling in traffic jams, driving in bad weather, and the like. The bad weather includes, for example, rain, snow, fog, and the like.

The log acquisition unit 12 acquires a driving scene in which the output data is calculated and output data as log data in association with each other. The log data includes, for example, output data for each driving scene as a set of time-series data. In the log data, the output data is basically compressed. For the log data, the compression of the output data is not mandatory. The log acquisition unit 12 calculates an amount of data for each driving scene as a storage capacity required for the storage of one event.

The influence degree acquisition unit 13, for example, acquires a degree of influence of the driving scene on the surroundings of the vehicle 1 based on the driving scene identified by the log acquisition unit 12. The degree of influence indicates a possibility of occurrence of an influence, risk, or inconvenience of traffic safety with respect to other vehicles. The degree of influence is preset in accordance with a driving scene in which the vehicle 1 can be located. The degree of influence may be set so that a value of the degree of influence is larger when it is more important in the post-verification of the result of calculating the autonomous driving control. For example, a degree of influence of a right or left turn at an intersection may be greater than a degree of influence of a lane change. A degree of influence of a right or left turn at an intersection where there is a pedestrian or an oncoming vehicle may be greater than a degree of influence of a right or left turn at an intersection where there is no pedestrian or oncoming vehicle. The degree of influence may be stored in the ECU 10 or may be acquired from outside the vehicle 1 via the communication unit 6.

The capacity shortage prediction unit 14 predicts a future capacity shortage in the storage unit 7 of the vehicle 1 based on a period of time of autonomous driving control and a road situation until the vehicle 1 reaches a destination. The capacity shortage in the storage unit 7 indicates that log data cannot be stored in the storage unit 7 due to a decrease in the remaining capacity of the storage unit 7 and the collection of log data is hindered. For example, the capacity shortage prediction unit 14 compares a difference between the remaining capacity of the storage unit 7 at present and an approximate value of an amount of log data with a predetermined capacity shortage threshold value. Thereby, the capacity shortage prediction unit 14 predicts the future capacity shortage in the storage unit 7 of the vehicle 1.

The approximate value of the amount of log data is an estimate of an amount of log data for use in predicting the future capacity shortage in the storage unit 7 of the vehicle 1. The approximate value of the amount of log data is preset for each driving scene based on, for example, the amount of data for each driving scene (a storage capacity required for storing one event) acquired in a past test or simulation and the like. The approximate value of the amount of log data may be calculated or corrected in real time for each driving scene based on the amount of data for each driving scene (a storage capacity required for storing one event) acquired in the past by the log acquisition unit 12. Also, for the log data of a regular driving scene acquired as a routine at a regular interval, the approximate value of the amount of log data may be calculated in accordance with a period of time of autonomous driving control and an average amount of log data until the destination.

The capacity shortage threshold value is a threshold value of the remaining capacity of the storage unit 7 for determining whether or not a future capacity shortage in the storage unit 7 of the vehicle 1 is predicted. The capacity shortage threshold value may be a preset parameter or may be adjusted in real time. The capacity shortage threshold value can be a different value based on the road situation for each driving scene. The capacity shortage threshold value may be adjusted in accordance with a type of road.

In accordance with the type of road, the approximate value of the amount of log data, for example, tends to be larger at an intersection and smaller when the vehicle 1 is going straight. The approximate value of the amount of log data tends to be large, for example, when an amount of traffic is large. The approximate value of the amount of log data tends to be large, for example, when the log data includes a plurality of driving scenes. The approximate value of the amount of log data tends to be larger on general roads other than motorways than on motorways. This is because the motorway has a simple structure, the driving direction is fixed, and the possibility of sudden changes in behavior of the vehicle is small. Therefore, for example, in a type of road where the amount of log data tends to be large on average as compared with other types of roads, the capacity shortage threshold value may be larger than the capacity shortage threshold value in other types of roads in accordance with this tendency.

The capacity shortage threshold value may be adjusted based on the number of near-miss events. For example, the capacity shortage threshold value may be larger than the capacity shortage threshold value in a road situation in which a near-miss event is unlikely to occur in a road situation in which a near-miss event is likely to occur, because the amount of log data of the non-stationary event tends to increase. Also, a near-miss event is an event that is not assumed in advance for each driving scene. Specific road situations in which near-miss events are likely to occur include branch points, merge points, narrow roads, and the like. On narrow roads, this is because there is a risk of pedestrians or the like jumping out, and the distance to other traffic participants tends to be closer.

The log storage unit 15 causes the storage unit 7 of the vehicle 1 to store log data. For example, when the future capacity shortage in the storage unit 7 of the vehicle 1 is predicted, the log storage unit 15 causes the storage unit 7 of the vehicle 1 to store log data with a priority corresponding to the degree of influence of the driving scene associated with the log data. In addition, when the future capacity shortage in the storage unit 7 of the vehicle 1 is not predicted, the log storage unit 15 may cause the storage unit 7 of the vehicle 1 to store log data regardless of the degree of influence of the driving scene on the surroundings of the vehicle 1.

If the external storage unit can be used via the communication unit 6 when the future capacity shortage in the storage unit 7 of the vehicle 1 is predicted, the log storage unit 15 may transmit log data to an external storage unit. In this case, the log storage unit 15 may delete the transmitted log data from the storage unit 7 of the vehicle 1 with respect to the log data stored in the storage unit 7 of the vehicle 1. For the log data acquired by the log acquisition unit 12 and transmitted without being stored in the storage unit 7 of the vehicle 1, the log storage unit 15 may not cause the storage unit 7 of the vehicle 1 to store the log data.

The log storage unit 15 may determine whether or not the external storage unit can be used based on communication quality of the communication network N. The log storage unit 15, for example, may use radio wave strength, a transmission frame rate obtained in association with the transmission of an image, or the like as the communication quality of the communication network N. Moreover, the log storage unit 15 may determine whether or not the external storage unit can be used based on the remaining capacity of the external storage unit.

As an example of the external storage unit, the autonomous driving system server 50 may be used. The autonomous driving system server 50 is a server capable of communicating with the vehicle 1. The autonomous driving system server 50 includes a communication unit 51, a storage unit 52, and an analysis event DB 53. The communication unit 51, for example, performs the communication of various types of information with the vehicle 1 via the communication network N. The communication unit 51 is not particularly limited and various known communication devices can be used.

The storage unit 52 stores log data for use in post-verification of a result of calculating the autonomous driving control. The storage unit 52, for example, is a recording device such as an HDD provided in the autonomous driving system server 50. The storage unit 52 has a log storage area for storing log data. That is, the autonomous driving system server 50 functions as an external storage unit for storing log data transmitted from the vehicle 1 via the communication network N. The log storage area has a finite capacity.

The analysis event DB 53 is a storage device for storing analysis information. The analysis event DB 53, for example, is formed in a recording device such as an HDD provided in the autonomous driving system server 50. The analysis information includes information of whether or not there is an analysis for performing post-verification of the result of calculating the autonomous driving control using log data, and information of an analysis result.

As another example of the external storage unit, other vehicles 20 may be used. The other vehicle 20 is a vehicle in the vicinity of the vehicle 1 located within a range in which communication with the vehicle 1 is possible. The other vehicle 20 includes an ECU 21, a communication unit 22, and a storage unit 23. The ECU 21 is an electronic control unit that executes a process related to the communication with the vehicle 1 and the storage of log data in the other vehicle 20. The communication unit 22, for example, performs the communication of various types of information with the vehicle 1 via the communication network N. The communication unit 22 is not particularly limited and various known communication devices can be used.

The storage unit 23 stores log data for use in post-verification of the result of calculating the autonomous driving control. The storage unit 23, for example, is a recording device such as an HDD provided in the autonomous driving system server 50. The storage unit 23 has a log storage area for storing the log data. That is, the other vehicle 20 functions as an external storage unit that stores log data transmitted from the vehicle 1 via the communication network N. The log storage area has a finite capacity.

The log storage unit 15 may determine whether or not the log data acquired by the log acquisition unit 12 is an analyzed event based on analysis information of the analysis event DB 53. The log storage unit 15, for example, can determine whether or not the log data acquired by the log acquisition unit 12 is an analyzed event according to log data already stored in the autonomous driving system server 50 or another vehicle 20. When it can be determined that the log data acquired by the log acquisition unit 12 is an analyzed event, the log data acquired by the log acquisition unit 12 may not be stored in the storage unit 7 of the vehicle 1. In this case, the log storage unit 15 may cause the storage unit 7 to store information specific to the vehicle 1 within the log data acquired by the log acquisition unit 12.

When it can be determined that the log data acquired by the log acquisition unit 12 is an unanalyzed event, the log storage unit 15 may cause the storage unit 7 or the external storage unit to store all of the log data acquired by the log acquisition unit 12.

Information specific to the vehicle 1 may include, for example, information about the specifications of the vehicle 1, calculation results of the machine learning model 11a, and control instruction values for the actuator 5. The information specific to the vehicle 1 may include difference data between the log data already stored in the autonomous driving system server 50 or the other vehicle 20 and the log data acquired by the log acquisition unit 12. The information specific to the vehicle 1 may include data based on a detection result of an in-vehicle sensor of a type not provided in the other vehicle 20 among the detection results of the sensor 2.

Also, the log storage unit 15 may use a storage device of the information processing terminal held by an occupant of the vehicle 1 as an external storage unit to store the log data acquired by the log acquisition unit 12 for evacuation.

Figure 3:
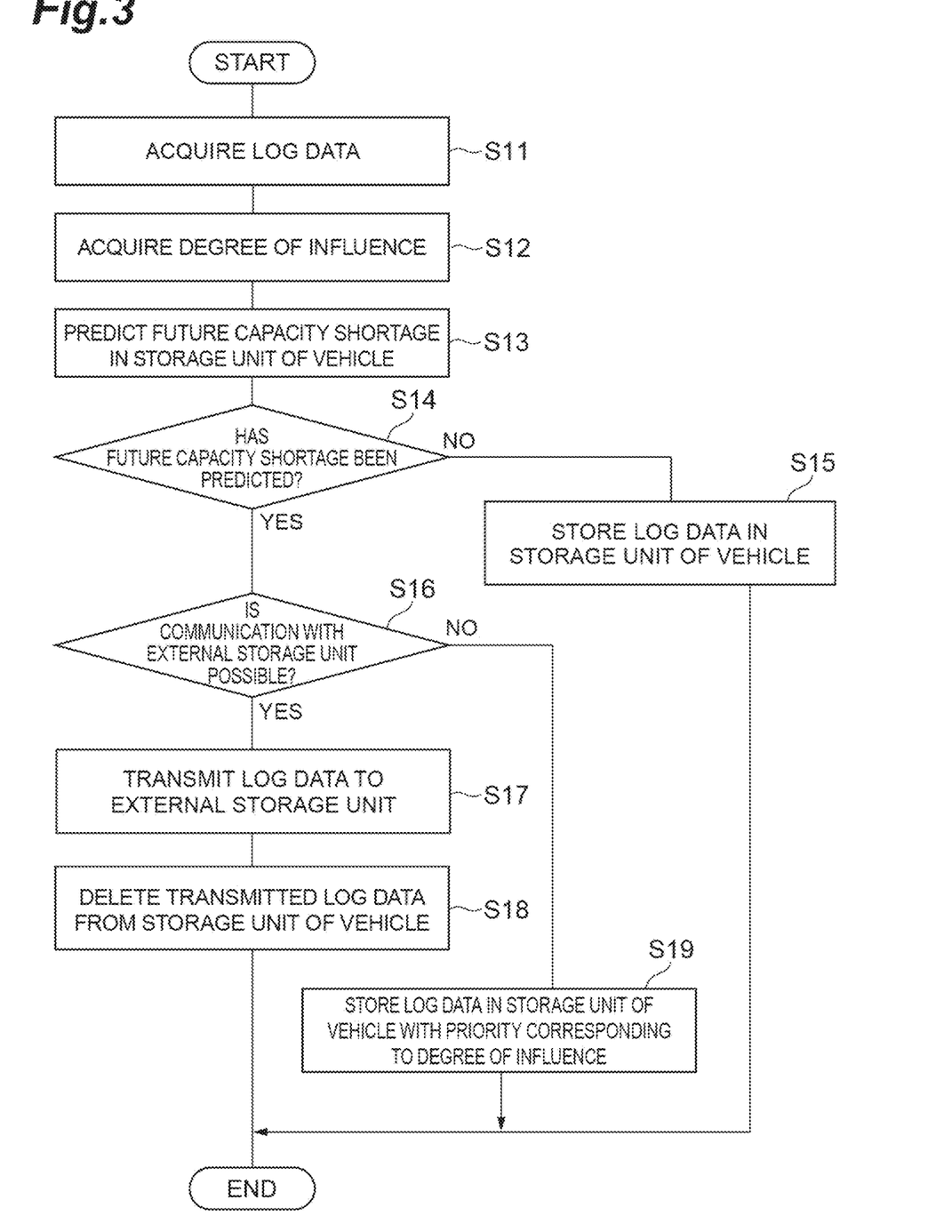
FIG. 3 is a flowchart showing a process of an ECU of FIG. 1.

Next, a process of the ECU 10 will be described with reference to FIG. 3. FIG. 3 is a flowchart showing an example of a log storage process of the ECU. The flowchart shown in FIG. 3 is iteratively executed at predetermined intervals, such as, for example, every time the autonomous driving processing unit 11 calculates a certain amount of output data during the autonomous driving of the vehicle 1.

As shown in FIG. 3, the ECU 10 acquires log data with the log acquisition unit 12 in S11. Based on a detection result of the sensor 2 of the vehicle 1, the autonomous driving processing unit 11 calculates output data related to autonomous driving control using, for example, the machine learning model 11a. The log acquisition unit 12 identifies a driving scene when the output data is calculated based on the detection result of the sensor 2 of the vehicle 1, map information, and a vehicle position. The log acquisition unit 12 acquires the driving scene in which the output data is calculated and the output data as the log data in association with each other.

In S12, the ECU 10 acquires a degree of influence with the influence degree acquisition unit 13. The influence degree acquisition unit 13, for example, acquires a preset degree of influence of the driving scene on surroundings of the vehicle 1 based on the driving scene identified by the log acquisition unit 12.

In S13, the ECU 10 predicts a future capacity shortage in the storage unit 7 of the vehicle 1 with the capacity shortage prediction unit 14. The capacity shortage prediction unit 14 predicts the future capacity shortage in the storage unit 7 of the vehicle 1 based on a period of time of autonomous driving control and a road situation until the destination of the vehicle 1.

In S14, the ECU 10 determines whether or not a future capacity shortage in the storage unit 7 of the vehicle 1 has been predicted with the log storage unit 15. The log storage unit 15, for example, determines whether or not a future capacity shortage in the storage unit 7 of the vehicle 1 has been predicted based on a result of comparison between a future capacity of the storage unit 7 of the vehicle 1 estimated by the capacity shortage prediction unit 14 and a predetermined capacity threshold value.

When it is determined that a future capacity shortage in the storage unit 7 of the vehicle 1 has not been predicted (S14: NO), the ECU 10 proceeds to the processing of S15. In S15, the ECU 10 causes the storage unit 7 of the vehicle 1 to store log data with the log storage unit 15. For example, the log storage unit 15 causes the storage unit 7 of the vehicle 1 to store log data regardless of the degree of influence of the driving scene on the surroundings of the vehicle 1. Thereafter, the ECU 10 ends the process of FIG. 3.

On the other hand, when it is determined that the future capacity shortage in the storage unit 7 of the vehicle 1 has been predicted (S14: YES), the ECU 10 proceeds to the processing of S16. In S16, the ECU 10 determines whether or not it is possible to communicate with the external storage unit with the log storage unit 15. The log storage unit 15, for example, determines whether or not it is possible to communicate with the autonomous driving system server 50 or other vehicles 20 around the vehicle 1 based on communication quality information of the communication network N.

When it is determined that communication with the external storage unit is possible (S16: YES), the ECU 10 proceeds to the processing of S17. In S17, the ECU 10 transmits log data to the external storage unit with the log storage unit 15. For example, the log storage unit 15 transmits log data acquired by the log acquisition unit 12 and not stored in the storage unit 7 of the vehicle 1 or log data stored in the storage unit 7 of the vehicle 1 to the autonomous driving system server 50 or the other vehicle 20. Subsequently, in S18, the ECU 10 deletes the transmitted log data from the storage unit 7 of the vehicle 1 with the log storage unit 15. The log storage unit 15, for example, deletes the log data transmitted in S17 from the storage unit 7 of the vehicle 1 with respect to the log data stored in the storage unit 7 of the vehicle 1. The log storage unit 15 can set the processing of S19 as a process of causing the storage unit 7 of the vehicle 1 not to store log data, acquired by the log acquisition unit 12 and not stored in the storage unit 7 of the vehicle 1, instead of deletion from the storage unit 7 of the vehicle 1. Thereafter, the process of FIG. 3 ends.

On the other hand, when it is determined that it is not possible to communicate with the external storage unit (S16: NO), the ECU 10 proceeds to the processing of S19. In S19, the ECU 10 causes the storage unit 7 of the vehicle 1 to store log data with a priority corresponding to the degree of influence with the log storage unit 15. The log storage unit 15 causes the storage unit 7 of the vehicle 1 to store the log data with a priority corresponding to the degree of influence of the driving scene associated with the log data. Thereafter, the process of FIG. 3 ends.

Here, a trained model generated in machine learning, such as, for example, the machine learning model 11a, is not always capable of implementing appropriate autonomous driving control in all driving scenes. As an example, if a surrounding environment of the vehicle 1 changes, a result of inferring the trained model is likely to change. For example, whether or not a result of calculating the autonomous driving control using the trained model can be said to be appropriate can change with a traffic environment such as weather, a time period, or an amount of traffic. Therefore, in order to appropriately operate the autonomous driving control based on the trained model, it is considered useful to have a mechanism that enables post-verification of the autonomous driving control. For this reason, it is conceivable to collect log data for use in post-verification of the result of calculating the autonomous driving control. However, there is a possibility that the log data of the result of calculating the autonomous driving control will be enormous.

In this regard, as described above, in the autonomous driving system 100, log data in which the output data and the driving scene are associated with each other is stored in the storage unit 7 of the vehicle 1 with a priority corresponding to the degree of influence of the driving scene. For example, useful log data can be effectively collected by preferentially storing log data corresponding to a driving scene having a large influence on the surroundings of the vehicle 1 in the storage unit 7 of the vehicle 1. Therefore, according to the autonomous driving system 100, it is possible to ensure the storage of log data for use in post-verification of the result of calculating the autonomous driving control.

The autonomous driving system 100 includes the capacity shortage prediction unit 14 configured to predict a future capacity shortage in the storage unit 7 of the vehicle 1 based on a period of time of autonomous driving control and a road situation until the vehicle 1 reaches a destination. When the capacity shortage in the storage unit 7 of the vehicle 1 is predicted, the log storage unit 15 causes the storage unit 7 of the vehicle 1 to store log data with a priority corresponding to a degree of influence. For example, if the storage unit 7 of the vehicle 1 runs out of capacity, there is a possibility that recording log data corresponding to a driving scene having a large influence on the surroundings of the vehicle 1 will fail. Therefore, when the capacity shortage in the storage unit 7 of the vehicle 1 is predicted, it is possible to ensure the storage of log data corresponding to the driving scene having a large influence on the surroundings of the vehicle 1 by storing the log data in the storage unit 7 of the vehicle 1 with a priority corresponding to the degree of influence.

The autonomous driving system 100 includes an external storage unit (the autonomous driving system server 50 or another vehicle 20) configured to store log data transmitted from the vehicle 1 via the communication network N, and a communication unit 6 provided in the vehicle 1 and configured to communicate with the external storage unit. The log storage unit 15 transmits the log data to the external storage unit and deletes the transmitted log data from the storage unit 7 of the vehicle 1. In this way, it is possible to suppress the capacity shortage in the storage unit 7 of the vehicle 1 while ensuring the storage of the log data by storing the log data in the external storage unit and deleting the log data from the storage unit 7 of the vehicle 1.

Modified Example

Although various exemplary embodiments have been described above, various omissions, substitutions, and changes may be made, without limitation to the exemplary embodiments described above.

Although the log storage unit 15 causes the storage unit 7 of the vehicle 1 to store log data with a priority corresponding to the degree of influence when a capacity shortage in the storage unit 7 of the vehicle 1 is predicted in the above-described embodiment, the preset disclosure is not limited to this example. The prediction of the capacity shortage in the storage unit 7 of the vehicle 1 may be omitted. The log storage unit 15 may cause the storage unit 7 of the vehicle 1 to store log data with a priority corresponding to the degree of influence, regardless of the remaining capacity of the storage unit 7 of the vehicle 1.

Although the log storage unit 15 transmits the log data to the external storage unit and deletes the transmitted log data from the storage unit 7 of the vehicle 1 in the above-described embodiment, the present disclosure is not limited to this example. The log storage unit 15 do not have to use the external storage unit.

Although the autonomous driving system 100 according to the embodiment calculates output data related to the autonomous driving control using the machine learning model 11a in the above-described embodiment, the use of the machine learning model is not mandatory.

The capacity shortage prediction unit 14 may determine whether or not a capacity shortage has been predicted at the time of setting a route of autonomous driving. When the capacity shortage has been predicted, the capacity shortage prediction unit 14 may provide a notification to the occupant of the vehicle 1 using an HMI of the vehicle 1 or the like. The capacity shortage prediction unit 14 may provide the notification to the occupant of the vehicle 1 to stop the vehicle 1 for a certain period of time using the HMI of the vehicle 1 or the like. The capacity shortage prediction unit 14 may provide the notification to the occupant of the vehicle 1 so that the vehicle 1 is manually driven for a certain period of time using the HMI of the vehicle 1 or the like. The certain period of time may be, for example, a period of time until the capacity shortage in the storage unit 7 is not predicted when processes of transmitting and deleting log data to the external storage unit with the log storage unit 15 (S17 and S18 described above) are performed. Also, the log storage unit 15 may be configured so that log data can be transmitted to the external storage unit according to a manual manipulation using the HMI of the vehicle 1 or the like.

The log acquisition unit 12 may be configured to acquire log data only when a predetermined event occurs.

What is claimed is:

1. An autonomous driving system for causing a storage unit of a vehicle to store output data related to autonomous driving control calculated based on a detection result of an in-vehicle sensor of the vehicle, the autonomous driving system comprising:
an electronic control unit configured to:
acquire a driving scene in which the output data is calculated and the output data as log data in association with each other;
acquire a preset degree of influence of the driving scene on surroundings of the vehicle based on the driving scene;
cause the storage unit of the vehicle to store the log data with a priority corresponding to the degree of influence of the driving scene associated with the log data;
predict a future capacity shortage in the storage unit of the vehicle based on a period of time of the autonomous driving control and a road situation until the vehicle reaches a destination;
cause the storage unit of the vehicle to store the log data with a priority corresponding to the degree of influence when the capacity shortage in the storage unit of the vehicle is predicted;
receive the detection result of the in-vehicle sensor and input the detection result into a machine learning model; and
in response, output a control signal to autonomously control the vehicle.

2. An autonomous driving system for causing a storage unit of a vehicle to store output data related to autonomous driving control calculated based on a detection result of an in-vehicle sensor of the vehicle, the autonomous driving system comprising:
an electronic control unit configured to:
acquire a driving scene in which the output data is calculated and the output data as log data in association with each other;
acquire a preset degree of influence of the driving scene on surroundings of the vehicle based on the driving scene;
cause the storage unit of the vehicle to store the log data with a priority corresponding to the degree of influence of the driving scene associated with the log data;
predict a future capacity shortage in the storage unit of the vehicle based on a period of time of the autonomous driving control and a road situation until the vehicle reaches a destination;
cause the storage unit of the vehicle to store the log data with a priority corresponding to the degree of influence when the capacity shortage in the storage unit of the vehicle is predicted;
receive the detection result of the in-vehicle sensor and input the detection result into a machine learning model; and
in response, output a control signal, to autonomously control the vehicle;
an external storage unit configured to store the log data transmitted from the vehicle via a network; and
a communication device provided in the vehicle and configured to communicate with the external storage unit,
wherein the electronic control unit is configured to transmit the log data to the external storage unit and delete the transmitted log data from the storage unit of the vehicle.

* * * * *